United States Patent [19]

Chamoux

[11] 4,406,539
[45] Sep. 27, 1983

[54] APPARATUS FOR AUTHENTIC REPRODUCTION OF ORIGINAL BASE DOCUMENT

[76] Inventor: Jean P. Chamoux, 67, rue de Miromesnil, 75008 Paris, France

[21] Appl. No.: 248,801

[22] Filed: Mar. 10, 1981

[30] Foreign Application Priority Data

Apr. 2, 1980 [FR] France .................................. 80 07450

[51] Int. Cl.³ ............................................. G03B 27/54
[52] U.S. Cl. ..................................... 355/43; 250/271; 283/113; 355/70; 428/916; 430/10
[58] Field of Search ...................... 430/10, 8; 194/100; 283/8 R, 8 B, 9 R; 250/271; 428/916; 355/40, 43, 46, 64, 65, 67, 70, 71, 77, 133

[56] References Cited

U.S. PATENT DOCUMENTS

| 3,682,539 | 8/1972 | Yamaji et al. ................ 355/70 X |
| 3,826,571 | 7/1974 | Spence-Bate ................ 355/43 X |
| 4,161,709 | 7/1979 | Spence-Bate ................ 355/64 |
| 4,181,427 | 1/1980 | Rotter ........................ 355/43 |

FOREIGN PATENT DOCUMENTS 2410855  8/1979  France ............................... 250/271

Primary Examiner—Richard A. Wintercorn
Attorney, Agent, or Firm—Darby & Darby

[57] ABSTRACT

Apparatus for making image reproductions is disclosed having means for providing on a photosensitive support or film two micrographic images, one from a source of white light and the other from a source of black light. A third image may also be provided on the film to provide selected information such as a picture number, or operator and user identification. In the disclosed embodiment, the black light is continuously on while the white light is flashed only when a picture is being taken.

10 Claims, 6 Drawing Figures

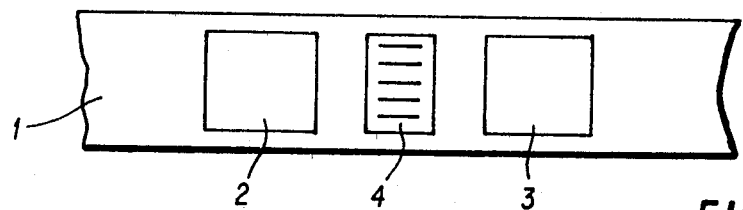
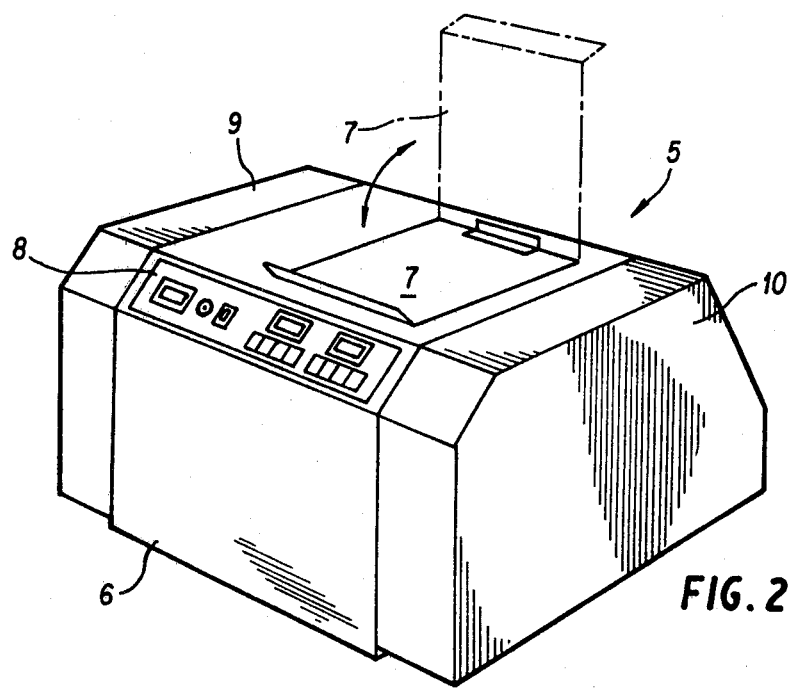
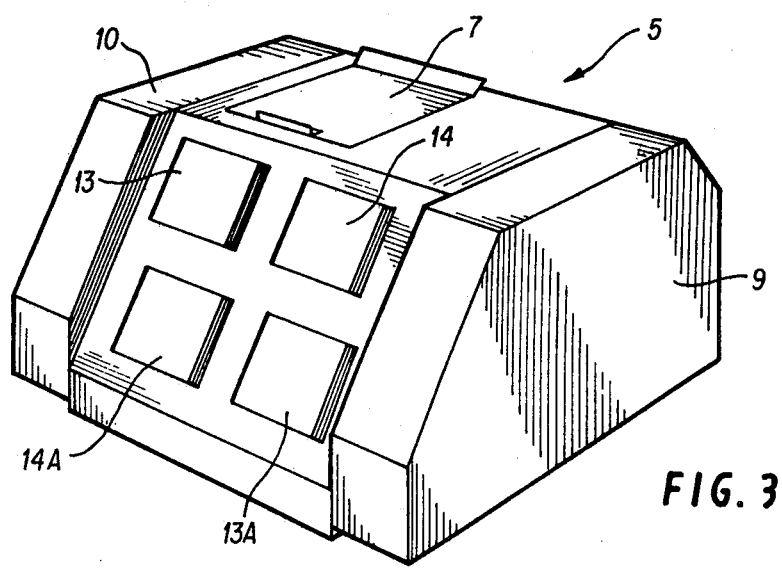

APPARATUS FOR AUTHENTIC REPRODUCTION OF ORIGINAL BASE DOCUMENT

The present invention relates to apparatus for making authenticatable reproductions of original documents.

At present, when a document is micrographed, modifications made therein subsequently or the intimate structure of the support (e.g. watermarks, flaws, irregularities) will not always show up in the micrograph.

At present, a microform is obtained by means of a source of light which has an emission spectrum the rays of which are within the visible ("white light"); the intimate detail of the document hardly appears, and differences of specular brightness of details and diversities of colors are not shown.

A process for making authenticatable reproductions of original documents will provide technical assurances as regards fidelity, stability, and difficulty of falsification of the reproduction. Such a process will, furthermore, furnish a most consistent and a most authenticatable reproduction of the document micrographed.

The said process thus consists of projecting on a same photosensitive support two images of the original document by micrography, viz. one image of a source of "white light" and one image of a source of light whose emission spectrum, i.e. rays, is mainly in the violet and ultraviolet, or of a source of "black light", so as to show the structure of the document, i.e. various factors that determine an original document such as flaws, watermarks, irregularities, etc., and any modifications made therein, the said various elements not necessarily being visible to the naked eye on the original document.

The photograph under "white light" will furnish a traditional microimage that will assure legibility and possible use of the information contained in the original document micrographed.

The second microimage obtained under "black light" shows each detail through specific fluorescent radiation processes, such as overthicknesses, retouches, erasures, "maskings", watermarks, etc.

A third microimage, so-called "identification" microimage, can be associated on the same support with the two preceding microimages and may contain, among other things, a sighting mark which will guarantee against possible duplications of the microform originally made, any duplications translating themselves, in effect, by a loss of definition.

The present invention relates to an apparatus for the use of the process for making authenticatable reproductions of original documents as specified above, said apparatus comprising, under a compact unit susceptible of being installed under ambient light, the elements that follow:

a source of "white light";

a source of "black light" operating continuously;

a tight "film advance" mechanism with feed and take-up magazines;

a single optical system serving to take a picture under "white light", a picture under "black light", and an "identification" picture, all on a same light-sensitive support or film.

The apparatus according to the present invention will furnish microforms on 8-mm, 16-mm and 35-mm films, and, by extension, on even larger size films.

Further characteristics and advantages of the present invention will become apparent from the description that follows, made on hand of the attached drawings, in which:

FIG. 1 shows, diagrammatically, a reproduction of a photosensitive support;

FIG. 2 shows a front view in perspective of an apparatus according to the invention;

FIG. 3 shows a rear view in perspective of an apparatus according to the invention;

Figure 4:
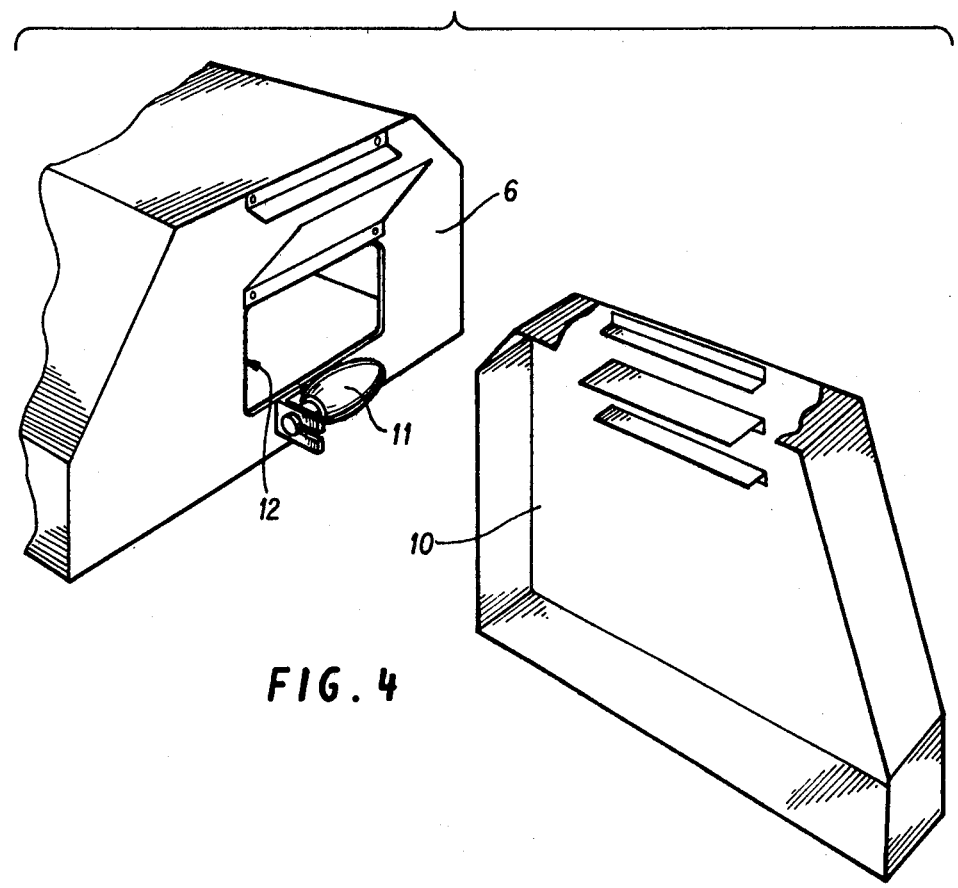
FIG. 4 shows in partial, exploded perspective view two elements of the apparatus according to the invention.
Figure 6:
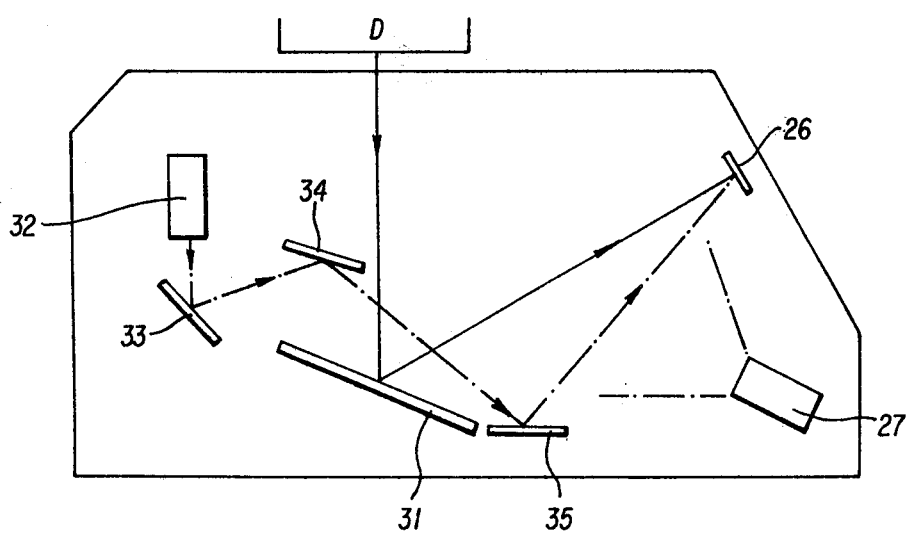
FIG. 6 shows a schematic view representative of part of the optical paths inside the apparatus according to the invention.

The reproduction apparatus according to the invention (FIG. 1) allows the presentation on a same light-sensitive support (film 1) of a double picture: one picture under "white light" 2 and one picture under "black light" 3, said double picture being accompanied or not accompanied by an identification picture 4.

The said identification picture 4 characterizes the double reproduction 2, 3 on film 1 of a document D and may contain, in particular, the following information:

a definition sighting mark for control of the quality of the photograph and to guarantee against any recopies of the said reproduction;

a scale for measuring rate of reduction;

a chronological identification number of the picture taken;

a number of identification of the material;

a gray or colored deed;

a means for identifying the operator, e.g. finger prints or photograph;

an identification of the user;

etc.

said list being, of course, given by way of example only.

Means are provided in the apparatus according to the invention for defining the said identification elements, one of said means to be described further on in connection with the optical paths between the said means and the means taking part in the taking of the picture (a burglar-proof picture counter in the given example).

The said third picture 4 may be eliminated, if necessary, and the information concerning identification may then be recorded directly on the main pictures, or at the side thereof.

In the particular embodiment shown, an apparatus 5 according to the invention is realized in form of a compact block so as to be used as a piece of office equipment, i.e. without requiring to be installed in a dark room as for conventional cameras.

The said apparatus comprises a central cabinet 6 the upper part of which is equipped with a device 7 that receives the documents to be microcopied D, said device being either a simple device as shown, or a device with semiautomatic or automatic feed (not shown).

A control panel 8 provided on a surface of the said cabinet coordinates these functions:

stop-go controlled by a safety switch;

numbering of photographs by a burglar-proof system (this number is transcribed in the "identification" picture);

controls of pictures taken, daily counters of pictures.

The optical and mechanical elements required for the taking of pictures are disposed inside said cabinet 6.

Two lateral cabinets 9 and 10 disposed to either side of central cabinet 6 contain the "black light" sources. A single lateral cabinet 10 is shown in FIG. 4; a "black light" lamp 11 is usually put in front of a window 12 made in the lateral wall of central cabinet 6 closest to the lateral cabinet in question. This "black light" lamp 11 operates continuously.

The apparatus according to the invention can be equipped either with one "film advance" mechanism with feed magazine 13 and take-up magazine 14, or with two identical mechanisms 13–14 and 13A–14A. These magazines are lighttight, thus making it possible to load and empty the apparatus in ambient light.

The first "film advance" mechanism allows to take double pictures in "white light" and in "black light" and an identification picture (see FIG. 1); the second "film advance" mechanism allows, for example, to take a picture in "white light" for a conventional microform, or a second identical microform.

A means is provided to assure exposure of the second "film advance" mechanism. This means can consist of a translation device 15 with 90° mirrors 16 and 17, as shown in FIG. 5.

The said translation device comprises a slide 18 on which the mirrors are mounted, said slide being connected by a rod 19 to an actuation disk 20.

Figure 5:
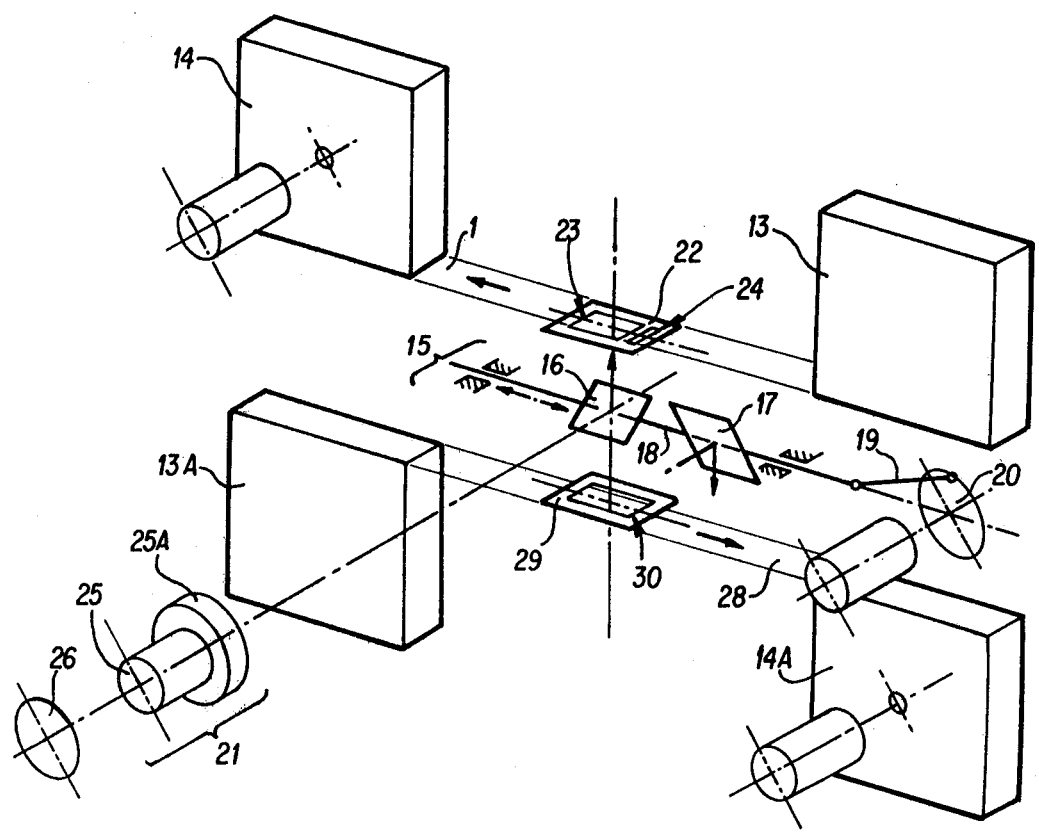
FIG. 5 shows a view in diagrammatic perspective of internal organs of the apparatus according to the invention.

An optical picture taking system 21 is shown diagrammatically in FIG. 5 and serves to take pictures under "white light" 2, pictures under "black light" 3, and pictures for "identification" 4, all of the said pictures being formed on a same photosensitive support or film 1.

The film 1 which is moved between magazine 13 and magazine 14 passes behind a frame 22 showing a main window 23 and an "identification" window 24. The 90° mirror 16 of translation device 15 is interposed between said frame and optical picture taking system 21 carrying a lens 25 and a shutter 25A.

An ultraviolet filter 26 is mounted in front of the said optical system; its presence allowing to record only the visible part of the fluorescence of the document being micrographed.

A flash lamp 27 illuminates document D at the moment a picture in "white light" is taken, whether it is a picture in white light 2 or a picture in white light for a so-called business microform, said business microform being produced on a photosensitive support or film 28, other than film 1.

Use of the translation device with mirrors 90° thus makes it possible to make pictures of the same document on two different films.

To produce conventional business microforms on film 28, the device 15 is translated so that the 90° mirror 17 is between a frame 29 with window 30 and optical picture taking system 21.

The light reflected by illuminated document D strikes a reflecting mirror 31 to be then directed at the lens of optical picture taking system 21.

In the embodiment shown by way of example, the light reflected by a burglarproof picture counter 32 strikes a series of reflecting mirrors 33, 34 and 35 to be then directed at the lens of optical picture taking system 21.

The apparatus according to the invention, finally, comprises electronic means for programming different operations of picture taking in "white light" and in "black light", and for "identification" purposes. The said electronic means does not form part of the present invention, and is thus not described or shown for purposes of the invention.

It goes without saying that the present invention is described and shown only by way of an example presently preferred, and that equivalent means may be substituted for its constitutive elements, without, for that matter, departing from the scope of said invention, said invention being further defined in the claims that follow.

I claim:

1. Apparatus for making authenticatable reproductions of original documents, said apparatus consisting of a compact unit able to be installed in ambient light, and comprising a source of white light, a source of black light operating continuously, a light tight film advance mechanism with feed and take-up magazines, and a single optical system serving to take at least one picture under white light, and a picture under black light, all on a same light-sensitive support or film, so as to obtain on said support a conventional microimage that will assure legibility and use of the information contained in the original document being micrographed, and an authenticating microimage showing every detail of the original document through specific fluorescent radiation processes.

2. Apparatus for making reproductions as set forth in claim 1, said apparatus further comprising means associated with the picture taking system for providing an identification picture on the same photosensitive support or film, so as to obtain on said support a third identification picture comprising at least one of:
   a definition pattern to reveal duplications of the first generation microform,
   a scale for measuring rate of reduction,
   a chronological identification number,
   a number of identification of the material,
   a gray or colored deed,
   a means for identifying the operator, and
   a means for identifying the user.

3. Apparatus as set forth in any of claims 1 or 2, said apparatus further comprising means for directing at the optical picture taking system the light reflected by the original document and the light reflected by means defining said identification elements; and a burglarproof counter for chronological numbers.

4. Apparatus as set forth in claim 3, said apparatus being further characterized in that it contains, between the optical picture taking system and the photosensitive support or film, a frame with windows comprising a main window and an identification window.

5. Apparatus as set forth in claim 1, said apparatus being further characterized in that an ultraviolet filter is disposed in front of the optical picture taking system so as to record only the visible part of the fluorescence of the document being micrographed.

6. Apparatus as set forth in any of claims 1, 2 or 5, said apparatus being further characterized in that it comprises a second tight film advance mechanism for a second sensitive support or film, said second mechanism allowing pictures to be taken in white light for producing on said second sensitive support conventional microforms or identical microforms.

7. Apparatus as set forth in claim 6, said apparatus being further characterized in that a means is provided for assuring the exposure of the second film advance mechanism.

8. Apparatus as set forth in claim 7, said apparatus further comprising a translation device with 90° mirrors interposed between the optical picture taking system and the two film advance mechanisms to make pictures either on one or on the other of the photosensitive supports or films of said mechanisms.

9. Apparatus as set forth in claim 8, said apparatus being further characterized in that a flash lamp illuminates the original document at the moment pictures in white light are taken.

10. Apparatus as set forth in claim 9, said apparatus further comprising a central cabinet equipped with means for receiving the original document to be micrographed, and a control panel and two lateral cabinets disposed on either side of said central cabinet, each of said lateral cabinets containing a source of black light.

* * * * *